Sept. 20, 1971  C. W. KIM  3,606,114

FIBRILLATION OF STRIATED FILMS
Filed Dec. 23, 1969

CHARLES W. KIM
INVENTOR.

BY *William S. Alexander*

ATTORNEY

United States Patent Office

3,606,114
Patented Sept. 20, 1971

3,606,114
FIBRILLATION OF STRIATED FILMS
Charles W. Kim, Wilmington, Del., assignor to
Hercules Incorporated, Wilmington, Del.
Filed Dec. 23, 1969, Ser. No. 887,569
Int. Cl. B26f 1/20, 3/02
U.S. Cl. 225—3                          2 Claims

ABSTRACT OF THE DISCLOSURE

A method is taught of fibrillating a striated film by contacting a film with a helically grooved fibrillation device having on its surface at least one section comprising left-handed helical threads and the same number of sections having right-hand helical threads. The threads are disposed in such a way that at the point where right and left-hand threads meet, the threads of one section abut the grooves between the threads on the other section. The total number of threads per inch on the surface of the device is approximately equal to the number of striations per inch on the film to be fibrillated.

---

This invention relates to a method and apparatus for preparing continuous filaments by fibrillating a uniaxially oriented film.

In recent years, substantial interest has developed in techniques for the production of fibers and filaments by fibrillation of extruded, uniaxially oriented films. This interest results mainly from the improved economics which fibrillation offers as compared to traditional filament forming techniques.

A recent development in the fibrillated film art has been the application of fibrillation techniques to striated films. Striated films, being composed of alternating relatively thick filamentary sections and relatively thin web sections, present clearly defined lines of weakness along which splitting or fibrillation can take place, namely the relatively thin web sections. By confining the splitting of the film to these specific areas, the striated film is fibrillated into continuous filaments as represented by the relatively thick sections. This is in contrast to previous processes where fibrillation was effected on flat films and principally staple fibers resulted.

It has been proposed to effect splitting or fibrillation of the aforementioned striated films, and of flat, unstriated films as well, by a variety of techniques. For example, it has been proposed to feed such a film through an air jet of the type sometimes employed to effect bulking of continuous filaments. The stresses resulting from the turbulent air flow within the jet cause the film to fibrillate. It has also been proposed to subject the film to the action of a rotary means having a plurality of sharp points which puncture the film at random locations, causing splitting along lines of weakness created by the uniaxial orientation. In yet another method, the film is drawn over a plurality of stationary sharp pins which initially puncture the film and thereafter tear it apart along lines substantially parallel to the direction of drawing.

Each of the above methods has been found to be effective for some purposes. Each, however, presents certain problems in its operation. For example, the fluid jet technique is objectionable in that the amount of fluid required for fibrillation makes the process economically unattractive. The methods based on sharp pointed pins or knives cause physical damage to the continuous filaments.

It is the object of this invention to provide a method and apparatus for fibrillating a striated film which method and apparatus is economical to operate, causes a minimum of physical damage to the filaments, and can be operated in a manner to effect a desired degree of fibrillation.

This and other objects of the invention are accomplished by contacting a striated film, having alternating relatively thick and relatively thin sections, to the action of a cylindrical, rotatable helically grooved member having a plurality of left-hand threads and an equal plurality of right-hand threads on its surface, said left and right-hand threads being diametrically opposed on the surface of said member, said member being positioned substantially perpendicularly to the longitudinal axis of the film and rotated, while in contact with the striated film, to effect fibrillation of said film in all of the relatively thin sections.

The process and apparatus for carrying out the same are depicted in the attached drawing in which.

Figure 1:
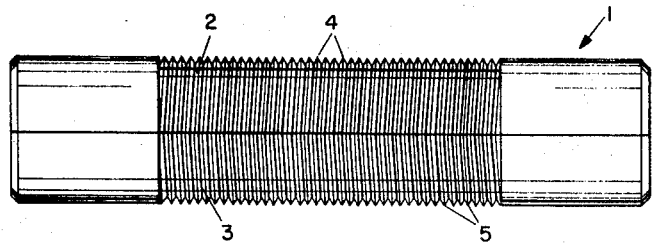
FIG. 1 shows one embodiment of the fibrillation device according to the invention.

The embodiment of the fibrillation device depicted in FIG. 1 comprises an elongated cylindrical member, indicated generally at 1, having on its surface two distinct helically threaded sections, 2 and 3. The threads 4 on threaded section 2 are right-hand threads, while the threads 5 on threaded section 3 are left hand threads. Each of the threaded sections comprises one half of the device, thus the two sections are diametrically opposed to one another.

Figure 2:
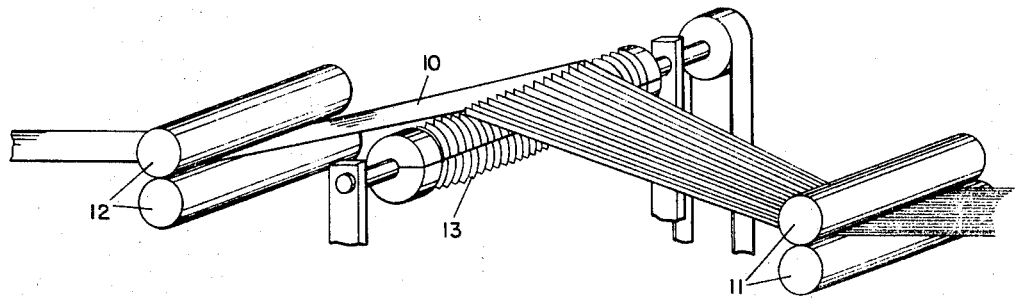
FIG. 2 is a schematic diagram illustrating the process of the invention.

In a typical operation of the grooved cylindrical member to carry out the process of the invention, as exemplified in FIG. 2, a sheet of uniaxially oriented striated film 10 is drawn by means of pull rolls 11 from a supply roll, not shown, around an idler guide roll 12 into contact with the rotating fibrillation device 13. The pull rolls, idler rolls, and fibrillation device are substantially perpendicular to the longitudinal axis of advancing film. The idler guide roll 12 and the pull rolls 11 are disposed at an angle to the center line of the device such that the striated film, in passing thereover, describes an angle less than 180°. Constant contact between the striated film and the fibrillation device, under tension, is thus assured. Such constant contact is needed to assure that each section of the film is contacted by the fibrillation device and that the device bears against the striated film with sufficient force to puncture the same in its thin areas. In operation of the apparatus, the fibrillation device is rotated while in contact with the film so that initially the film, in some of its thin areas, is borne upon by the threads of one hand and split in the areas contacted. After half a revolution, the hand of the threads in contact with the film reverses, whereby adjacent thin sections of the film are contacted and these, in turn, are split. The fibrillated film, reduced to continuous filaments, is then rewound.

The threads on the opposed sections of the fibrillation device are staggered with respect to each other as shown in FIG. 1. That is to say, at the points where right and left-threads meet, the threads of one section abut the grooves between the threads on the other section. Such an arrangement causes the shifting of the thread between striations when the direction of the threads changes.

The cylindrical, threaded fibrillation device can contain two diametrically opposed thread sections or any even-numbered plurality of such sections, the number of the same being limited primarily by the practical difficulties encountered in the fabrication of the device. The total number of threads per inch on the fibrillation device, i.e., the sum of left threads plus right threads per inch should preferably be equal to the number of striations per inch on the film. Additionally, each thread should be displaced from the preceding thread, at the transition point, by a distance equal to the lateral displacement between striations. In this way, there will be a thread available to puncture each thin web section of the film periodically.

As stated previously, fibrillation of the film is effected by the puncturing action of the threads on the film at each point where the hand of the threads shifts between left and right. The amount or degree of fibrillation is thus determined by the number of times that such reversal takes place within a unit length on the film. The number of such reversals is a function of the linear rate of advancement of the film, the rotation rate of the fibrillation device and the number of oppositely threaded sections on the surface of the device. Specifically, an increase of the rotation rate and/or an increase in the number of oppositely threaded sections on the device will result in an increase in the degree of fibrillation at a given rate of film travel.

It has been found that, to effect fibrillation of a striated film to the point where it is completely reduced to individual continuous monofilaments, it is necessary to have at least 10 and preferably about 15 reversals of thread direction per linear inch of film. Assuming the number of threads per inch on the fibrillation device is equal to the number of striations per inch on the film, the following formula can be used to calculate the number of reversals per inch of film which will result from a particular fibrillation device and a given set of operating conditions:

$$N=RW/V$$

where $N$=number of reversals per inch of film length, $R$=number of reversals per revolution of the fibrillation device, $W$=revolutions of device per minute, and $V$= velocity of the film in inches per minute.

By varying the degree of fibrillation of the film, it is possible to prepare various types of products using the process and apparatus of this invention. For example, by complete fibrillation of a highly oriented striated film as is accomplished when N in the above equation is greater than 10, one prepares continuous filaments having the residues of the web sections attached to and protruding from them. When these filaments are gathered into a yarn and twisted, the yarn has the appearance of a yarn spun from staple fibers. When N in the equation is less than about 10, a net-like structure results due to incomplete splitting of the webs leaving the ends of the web residue attached to adjacent filaments. An incompletely fibrillated product of this type is advantageously employed in many applications where a continuous monofilament beam or tow is needed. Such products can also be twisted to form yarns having a structure and appearance similar to the spun look yarn prepared from the completely fibrillated product.

If the web between the striations is particularly narrow, continuous filaments can be prepared which are smooth, lacking the aforementioned spun look. These can be subjected to mechanical bulking in the same manner as are continuous smooth filaments.

The process and apparatus of the invention can be employed with any of the conventional film forming materials which can be extruded into striated film either by melt or solution techniques and of a thickness corresponding to a filament denier of about 1 to 50. Such materials as polyethylene, polypropylene, poly(ethylene terephthalate), nylon, and acrylic polymers are applicable. Normally, the striated film will be uniaxially oriented parallel to the striations. While it is possible to apply the process to an unoriented film, this is not usually done since the demand for unoriented filaments is quite limited. Moreover, the orientation is found to be helpful during fibrillation in that a uniaxially oriented thin web is more fissile than an unoriented web. Such orientation of the film can be effected by procedures which are well known in the art. Preferably, the film can be drawn by means of differentially driven feed and draw rolls. A draw of about 3 to 6 times the original length of the film is normally effected. It is practical to accomplish drawing and fibrillation of the film as parts of a continuous process wherein the film is fed from a mill roll, around the draw rolls and directly to the fibrillation device.

What I claim and desire to protect by Letters Patent is:

1. Apparatus for effecting fibrillation of a striated film which comprises a rotatable, cylindrical, helically grooved member having a plurality of right-hand threads and a plurality of left-hand threads on its surface, the number of said right-hand threads being the same as the number of said left-hand threads, said right and left-hand threads being diametrically opposed on said cylindrical member, and said threads being adapted to abut the grooves between the threads of opposite hand at the point where said threads meet.

2. A process for preparing continuous filaments by a fibrillation process which comprises subjecting a striated thermoplastic film having alternating relatively thick and relatively thin sections to the action of a cylindrical, rotatable, helically grooved member, having a plurality of left-hand threads and an equal plurality of right-hand threads on its surface, said left and right-hand threads being diametrically opposed on the surface of said member, said member being positioned substantially perpendicularly to the longitudinal axis of the film and being rotated while in contact with said film.

References Cited

UNITED STATES PATENTS

| | | |
|---|---|---|
| 3,035,497 | 5/1962 | Whitehead et al. |
| 3,156,016 | 11/1964 | Dunlap et al. |
| 3,416,772 | 12/1968 | Sheehan _____ 225—3 |

FRANK T. YOST, Primary Examiner

U.S. Cl. X.R.

28—Dig. 1; 225—93, 97